United States Patent [19]

Imazeki et al.

[11] Patent Number: 5,583,728
[45] Date of Patent: Dec. 10, 1996

[54] IMPROVED MAGNETIC HEAD HAVING SMOOTHED CHAMFERED SURFACE FOR REDUCING MAGNETIC SCATTERING

[75] Inventors: Nobuo Imazeki, Iwate-ken; Minoru Kanda, Saitama-ken; Tatsushi Shimizu, Saitama-ken; Kazuhiro Saito, Saitama-ken, all of Japan

[73] Assignee: Japan Energy Corporation, Tokyo, Japan

[21] Appl. No.: 252,497

[22] Filed: Jun. 1, 1994

[30] Foreign Application Priority Data

Feb. 4, 1994 [JP] Japan .................................. 6-032061

[51] Int. Cl.⁶ .................................................. G11B 5/31
[52] U.S. Cl. ................................... 360/119; 360/125
[58] Field of Search ............................. 360/119, 122, 360/123, 125

[56] References Cited

U.S. PATENT DOCUMENTS 4,188,649  2/1980  Cheatham et al. ............... 360/119
4,361,860  11/1982  Nozawa ............................ 360/120

FOREIGN PATENT DOCUMENTS

| 63-213106 | 9/1988 | Japan | 360/119 |
| 2-183406 | 7/1990 | Japan | 360/119 |
| 2-183407 | 7/1990 | Japan | 360/119 |
| 2-254607 | 10/1990 | Japan | 360/119 |
| 2-304705 | 12/1990 | Japan | 360/125 |

*Primary Examiner*—John H. Wolff
*Assistant Examiner*—Brian E. Miller
*Attorney, Agent, or Firm*—Panitch Schwarze Jacobs & Nadel, P.C.

[57] ABSTRACT

At least the first chamfered portion 22 for forming the apex portion 8 has a surface roughness ($R_{p-p}$) of 0.6 µm or under. This first chamfered portion 22 is formed through grinding with a #2500 or #1500 grinding stone.

4 Claims, 5 Drawing Sheets

IMPROVED MAGNETIC HEAD HAVING SMOOTHED CHAMFERED SURFACE FOR REDUCING MAGNETIC SCATTERING

FIELD OF THE INVENTION

The present invention relates to a magnetic head obtained by face-to-face bonding together two magnetic core halves, i.e., an I core and a C core, or a C core and a C core, with a predetermined gap therebetween. More particularly, the present invention concerns a magnetic head which is suitably embodied into a magnetic head which employs a soft magnetic thin film such as an Fe-Si-Al alloy magnetic film and can be used suitably as high-density recording heads, for which high-frequency and high signal-to-noise (S/N) ratio are required, including video heads, computer heads, etc., and the present invention is effectively applicable for the manufacture of such a magnetic head.

PRIOR ART

The present inventors have proposed a laminated thin film type magnetic head, excellent in recording demagnetization and play-back efficiency, using an Fe-Si-Al alloy magnetic film suitably used as video heads, computer heads, etc. (Japanese Patent Application No. 5-516,881). The configuration of this magnetic head is illustrated in FIG. 1, and the structure thereof will now be briefly described below.

As shown in FIG. 1, the laminated thin film type magnetic head 1 has a pair of magnetic core halves, i.e., an I core 2 and a C core 4, each of them having a laminated thin film structure obtained by depositing an Fe-Si-Al alloy thin film 100 on a ceramic substrate, for instance. The I and C cores 2 and 4 have their mating surfaces bonded together via a gap 6. Generally, in such a magnetic head, a chamfered portion or an apex portion 8 is formed adjacent to the gap 6 by machining in order to obtain magnetic flux concentration, and to accurately bond the core halves, the apex portion being filled with apex glass 10.

In the above-mentioned magnetic head 1, the apex portion 8 is made by forming a first chamfered portion 22 and a second chamfered portion 24 in the C core. It is not always necessary to apply special machining for forming the apex portion 8 in the I core 2.

More specifically, the first chamfered portion 22 of the apex portion 8 is formed by chamfering with a first apex angle (α) over a prescribed apex length (T) conducting the apex position corresponding to the gap depth (D). The second chamfering portion 24 is formed, adjacent to the first chamfered portion 22, by chamfering at a second chamfering angle, i.e., a second apex angle (β). Each of the first and second apex angles (α) and (β) as herein used means an opening angle formed from a plane parallel to the mating surfaces between the I and C cores 2 and 4, as shown in FIG. 1, and the apex length (T) means a distance as measured from the plane of the gap 6 vertically relative to this plane.

Excellent results are available by setting, for example, the first apex angle (α) to 84°, the apex length (T) to 50 μm, and the second apex angle (β) to 45°.

The magnetic head 1 thus prepared is then subject to further processing depending on the purpose, such as for a computer or for a video.

The magnetic head 1 having the above-mentioned configuration is excellent in both recording demagnetization and play-back efficiency and can be suitably applied for video heads, computer heads and the like.

When the gap depth (D) is reduced in an attempt to improve reproducing efficiency in the magnetic head 1 having the above-mentioned configuration, a problem of scattering of magnetic properties is encountered: in an extreme case, a quasi-gap appears or a substantially different apex angle is formed making it impossible to obtain desired magnetic head properties.

In the present specification, "bit shift wiggle" means a value of relative standard deviation (%) of bit shift, as represented by the following formula. Usually, the value should preferably be up to 6%. The present inventors calculated the value based on the data obtained by recording and playing back a random pattern on a recording medium having a coercive force (Hc) of 1,600 Oe at a relative speed between the medium and the magnetic head of 20 m/second and a recording frequency of 17 MHz, and measuring the bit shift (BS) under a bit error rate (BER) condition of $10^{-7}$ repeatedly twenty times.

[Formula 1]
$$\text{Bit shift wiggle} = \frac{\text{standard deviation of bit shifts}}{\text{average of bit shifts}} \times 100(\%)$$

The conventional magnetic head 1 having the above-mentioned configuration has shown a bit shift wiggle of over 6% as the gap depth (D) was decreased.

As a result of a further study about the scattering of magnetic properties as described above, the present inventors found out that the cause was in the method of making the first chamfered portion 22 and the second chamfered portion 24 of the C core 4 composing the apex portion 8. More specifically, it is the conventional practice to grind the first chamfered portion 22 and the second chamfered portion 24 by means of a #1000 grinding stone, leading to the surface roughness ($R_{p-p}$) thereof scattering within a range of from 0.5 to 1.0 μm. Grinding with the use of a #2500 or #1500 grinding stone could in contrast, at least for the first chamfered portion 22, inhibit the surface roughness ($R_{p-p}$) to below 0.6 μm, thus eliminating scattering of magnetic properties.

The present invention was made on the basis of the above-mentioned new findings by the present inventors.

SUMMARY OF THE INVENTION

An object of the present invention is therefore to provide a magnetic head free from scattering of magnetic properties, excellent in both the properties of recording demagnetization and play-back efficiency, which employs a soft magnetic thin film as a head core, for example, an Fe-Si-Al alloy magnetic film and can be used suitably as high recording density heads, for which a high frequency and high signal-to-noise (S/N) ratio are required, including video heads, computer heads, etc., and a method of manufacturing the same.

The above-mentioned object is achieved by the magnetic head and the method of manufacturing the same of the present invention. In summary, according to the invention there is provided a magnetic head comprising a pair of magnetic core halves with mating surfaces thereof bonded together via a gap, an apex portion being formed adjacent said gap, and a chamfered portion formed on said magnetic core halves to form said apex portion having a chamfered surface roughness ($R_{p-p}$) of up to 0.6 μm. The chamfered surface roughness ($R_{p-p}$) should be up to 0.6 μm, or more preferably, up to 0.2 μm. The chamfered surface roughness ($R_{p-p}$) is brought to 0.3 to 0.6 μm by grinding by means of a #1500 grinding stone, and to 0.1 to 0.2 μm by grinding by means of a #2500 grinding stone.

According to another embodiment of the invention, there is provided a magnetic head comprising a pair of magnetic core halves with mating surfaces thereof bonded together via a gap, an apex portion being formed adjacent said gap, said apex portion having a first chamfered portion and a second chamfered portion formed at least in one of said magnetic core halves, said first chamfered portion being formed such as to have a first apex angle (α) of from 65° to 90° at a position (D) corresponding to a predetermined gap depth and have a predetermined apex length (T), the second chamfered portion being contiguous to the first chamfered portion and having a second apex angle (β) smaller than the first apex angle (α), and at least said first chamfered portion having a chamfered surface roughness ($R_{p-p}$) of up to 0.6 μm. The chamfered surface roughness ($R_{p-p}$) of the first chamfered portion should be up to 0.6 μm, or more preferably, up to 0.2 μm. The chamfered surface roughness ($R_{p-p}$) of the first chamfered portion is brought to 0.3 to 0.6 μm by grinding by means of a #1500 grinding stone, and to 0.1 to 0.2 μm by grinding by means of a #2500 grinding stone.

PREFERRED EMBODIMENTS OF THE INVENTION

Now, the magnetic head according to the invention will be described in more detail with reference to the drawings.

Figure 1A:
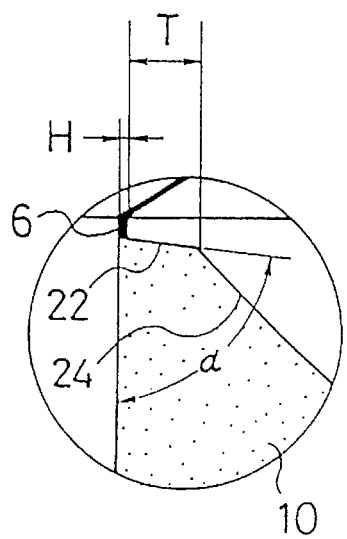
FIG. 1a is an enlarged fragmentary view of a portion of FIG. 1.
Figure 1:
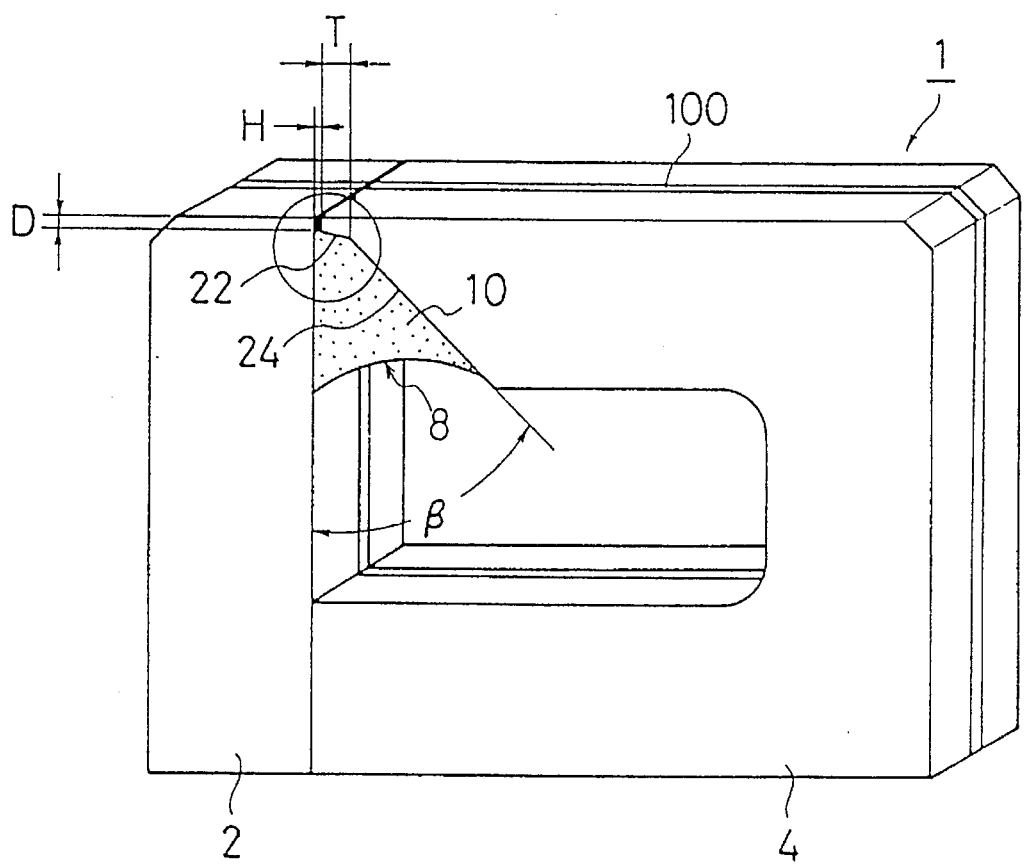
FIG. 1 is a configuration diagram showing an embodiment of the magnetic head according to the invention.

The present invention can be suitably embodied into a laminated thin film type magnetic head 1 shown in FIG. 1. This embodiment therefore illustrates this laminated thin film type magnetic head.

In this embodiment, more specifically, the laminated thin film type magnetic head 1 has a pair of magnetic core halves, i.e., I core 2 and a C core 4, prepared from laminated thin film structures formed by depositing an Fe-Si-Al alloy thin film 100 on a CoO-NiO ceramic substrate comprising 35 wt. % CoO - 65 wt. % NiO added with $Al_2O_3$, the I and C cores 2 and 4 having their mating surfaces bonded together via a gap 6. In the I and C cores 2 and 4, the chamfered portion, i.e., an apex portion 8, that is formed adjacent to the gap 6 by machining, is filled with apex glass 10 to increase bonding strength.

In the magnetic head of this embodiment, the apex 8 is made by forming a first chamfered portion 22 and a second chamfered portion 24 in the C core. Chamfering may be applied as required to the I core 2.

In further detail, the first chamfered portion 22 in the apex portion 8 is formed by chamfering with a first apex angle (α) over a prescribed apex length (T) conducting the apex position corresponding to the gap depth (D). The second chamfered portion 24 is contiguous to the first chamfered portion 22 and is formed so as to have a second chamfer angle, i.e., second angle (β). The second apex angle (β) is made smaller than the first apex angle (α). As roll-off is pronounced when the first apex angle (α) is made under 70°, the first apex angle (α) should preferably be set to between 70° (or more preferably 75°) and 90°. The second apex angle (β) of about 45° gives the highest play-back efficiency of the magnetic head 1. It should therefore be within a range of from between 15° or over (preferably 30° or over) to 70° (preferably 60°).

Figure 2:
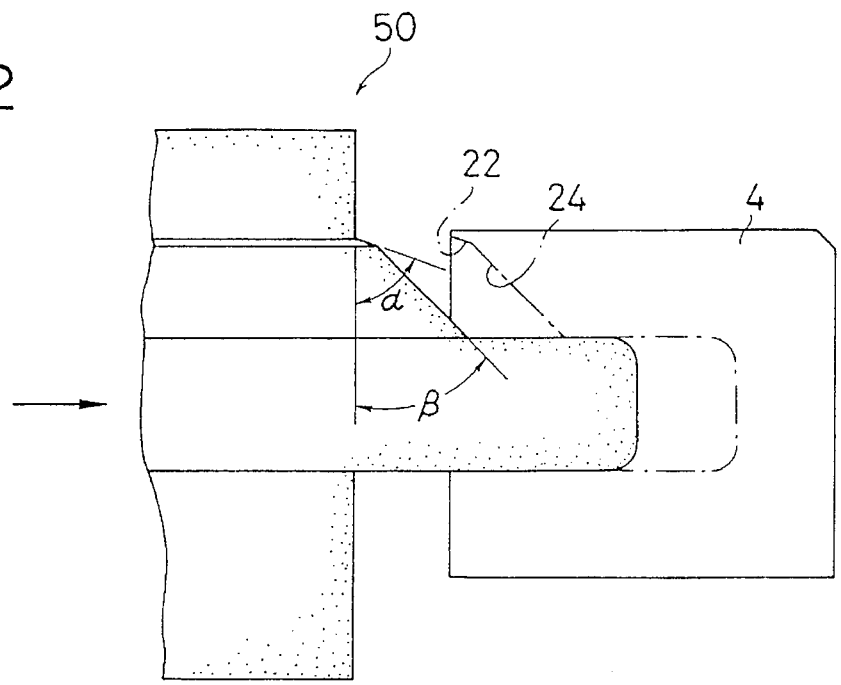
FIG. 2 is a descriptive view showing an embodiment of the manufacturing method according to the invention.

The apex portion 8 having a profile provided with the above-mentioned first chamfered portion 22 and second chamfered portion 24 may be processed by any of various methods: for example, it can be suitably processed by using a cutting blade (grinding stone) 50 having a profile as shown in FIG. 2, with two angles (α) and (β) equal to the first and second apex angles.

In preparing the magnetic head 1 having the above-mentioned configuration, the present inventors used three kinds of roughness of grinding stones including #1000, #1500 and #2500 for the grinding stone 50, and carried out many processing experiments under processing conditions such as revolutions of the grinding stone, processing speed and pressure changed to various values. While it was impossible to generally determine the relationship between the roughness number (#) of grinding stone and the surface roughness ($R_{p-p}$) of the chamfered portions 22 and 24, unlike the processing conditions, processing was conducted while selecting processing conditions capable of giving the best results for each grinding stone employed. A CoO-NiO ceramic substrate comprises 35 wt. % CoO - 65 wt. % NiO added with 2 wt. % $Al_2O_3$, and the head core was formed by using an Fe-Si-Al alloy thin film. The results of the experiments are shown in Table 1.

In the magnetic head 1 used in these experiments the first apex angle (α) of the apex portion 8 of the C core 4 was set to 84°, the second apex angle (β), to 45°, the apex length (T), to 50 μm, and the gap depth (D), to 4 μm.

Figure 3:
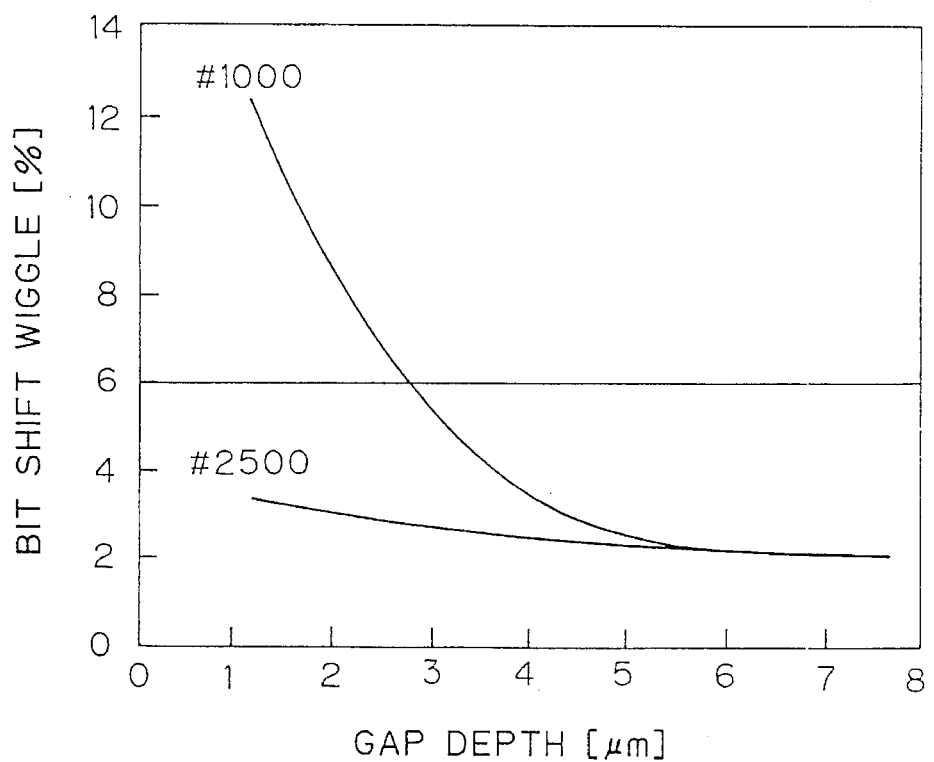
FIG. 3 is a graph showing the relationship between bit shift wiggle and the gap depth in the magnetic head according to the invention and comparative examples.

Further, the present inventors used #1000 and #2500 grinding stones as the grinding stone 50, and investigated the relationship between bit shift wiggle and the gap depth (D), by preparing magnetic heads 1 with different gap depths (D) while selecting processing conditions giving the best results. The results obtained are shown in FIG. 3.

TABLE 1

|  | Grinding stone # | Surface roughness $R_{p-p}$ (μm) | Scattering of magnetic property |
| --- | --- | --- | --- |
| Comparative example | 1000 | 0.6–1.0 | Present |
| Example | 2500 | 0.1–0.2 | None |
| Example | 1500 | 0.3–0.6 | None |

Table 1 reveals that, by conducting grinding with the use of a #2500 grinding stone, the surface roughness ($R_{p-p}$) is brought to 0.1 to 0.2 μm, and by conducting grinding with the use of a #1500 grinding stone, to 0.3 to 0.6 μm. When the apex portion 8 was chamfered with the use of #2500 and #1500 grinding stones, i.e., conducting grinding so as to give a surface roughness ($R_{p-p}$) of the chamfered portions 22 and 24 of the apex portion 8 of 0.6 μm or under (i.e., within a range of from 0.1 to 0.6 μm), or more preferably, of 0.2 μm or under (i.e., within a range of from 0.1 to 0.2 μm), scattering of magnetic property as typically represented by bit shift wiggle could be reduced.

It is furthermore understood from FIG. 3 that, even with a reduced gap depth (D), bit shift wiggle can be kept at 6% or under in the magnetic head of the present invention.

When conducting by the use of a #1000 grinding stone, in contrast, any change in processing conditions usually resulted in a surface roughness ($R_{p-p}$) of over 0.6 μm, only rarely leading to 0.5 μm. Although it is possible to bring the magnetic property, i.e., bit shift wiggle, to under 6% when the gap depth (D) is at least 3 μm, a gap depth shallower than 3 μm results in an increase in bit shift wiggle to about 12%, and serious scattering of the magnetic property.

This demonstrates that the present invention can be most effective with a gap depth of up to 5 μm, or more preferably, up to 3 μm.

According to the results of further experiments and studies carried out by the present inventors, the finish of the second chamfered portion 24 of the apex portion 8 has no effect on scattering of the magnetic property, so that it is not necessarily required to process the second chamfered portion 24 to bring its surface roughness ($R_{p-p}$) to 0.6 μm or under.

Figure 4:
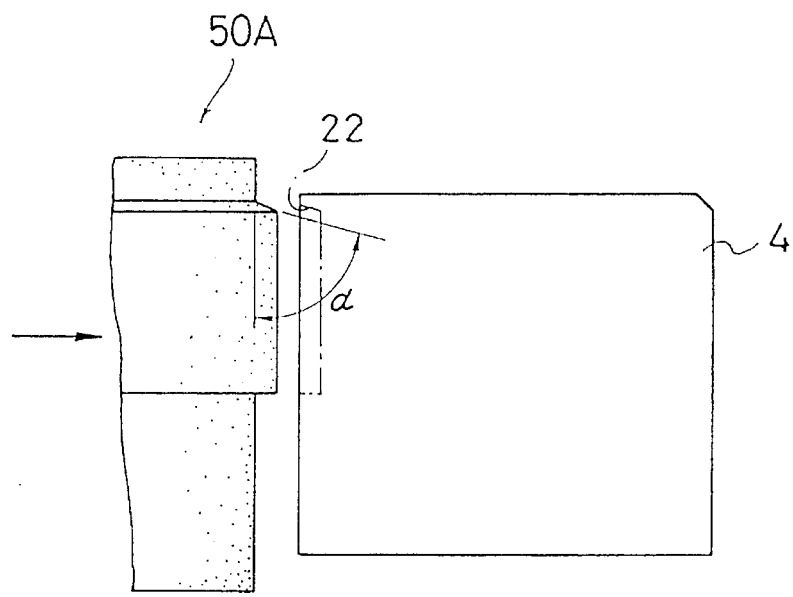
FIG. 4 and FIG. 5 are descriptive views showing another embodiment of the manufacturing method according to the invention.
Figure 5:
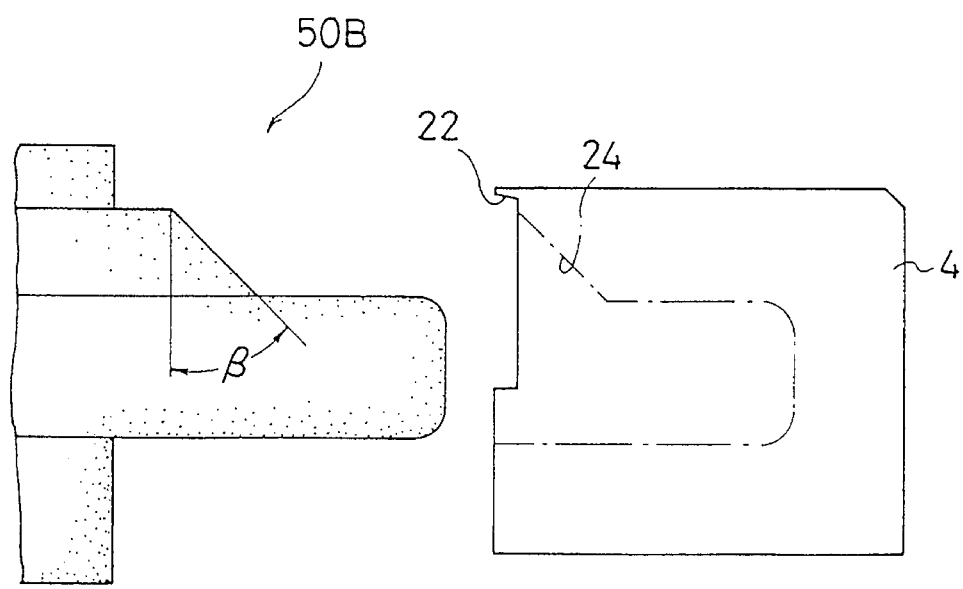
Figure 6:
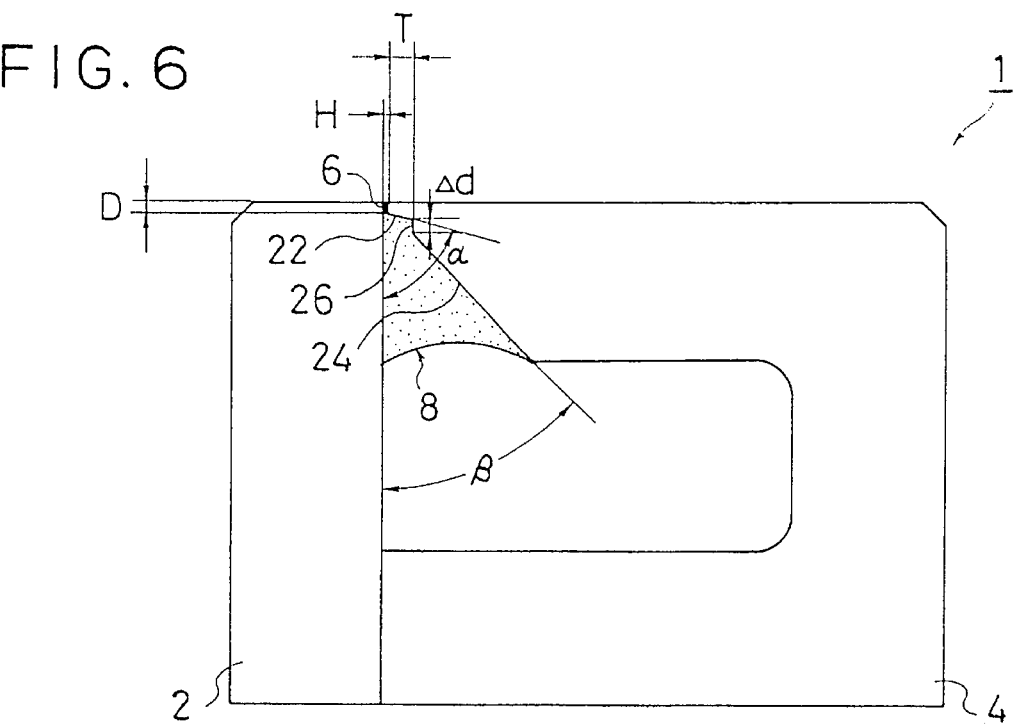
FIG. 6 is a descriptive view showing another embodiment of the magnetic head according to the invention.

It is therefore possible, not by a single run of processing with the use of a grinding stone 50 having a profile as shown in FIG. 2, to first conduct spot facing by using a #1500 or #2500 grinding stone 50A as shown in FIG. 4, thereby forming the first chamfered portion 22, and then, to process the second chamfered portion 24 by using a rougher, for example #1000, grinding stone 50B as shown in FIG. 5. Since the adoption of such a finishing method, though leading to an increase in the number of processing steps, eliminates the necessity of finishing a chamfered portion at a high accuracy by using a #1500 or #2500 grinding stone, thus consequently permitting improvement of the processing efficiency. According to this processing method, a step 26 of about Δd=0 to 50 μm is produced, as shown in FIG. 6, between the first chamfered portion 22 and the second chamfered portion 24. To judge from the results of an experiment carried out by the present inventors, however, a step 26 of this order never exerts an adverse effect on the magnetic property.

Figure 7:
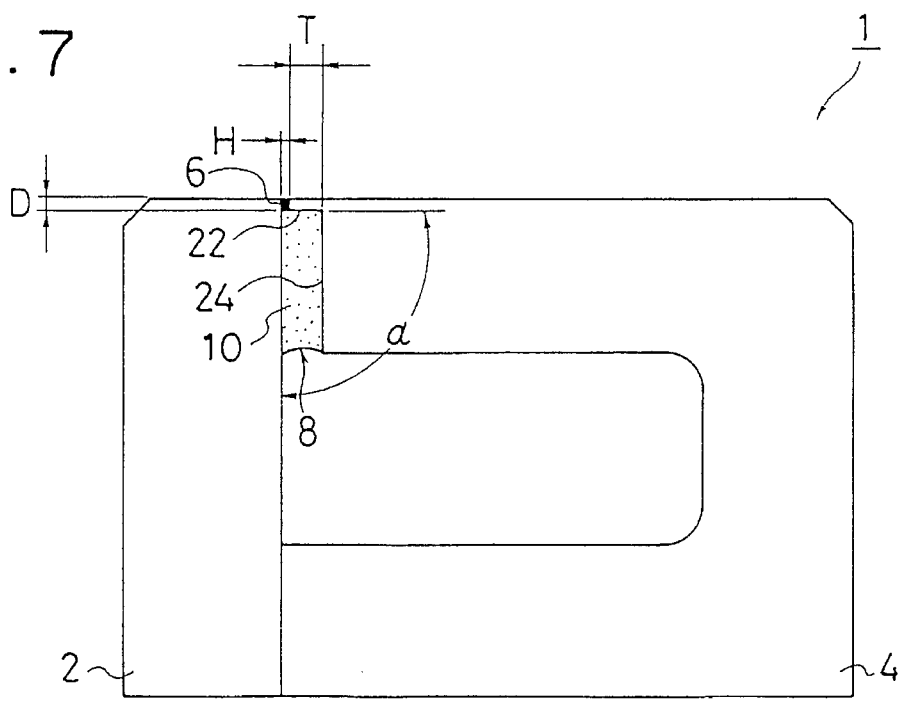
FIG. 7 is a descriptive view showing further another embodiment of the magnetic head according to the invention.
Figure 8:
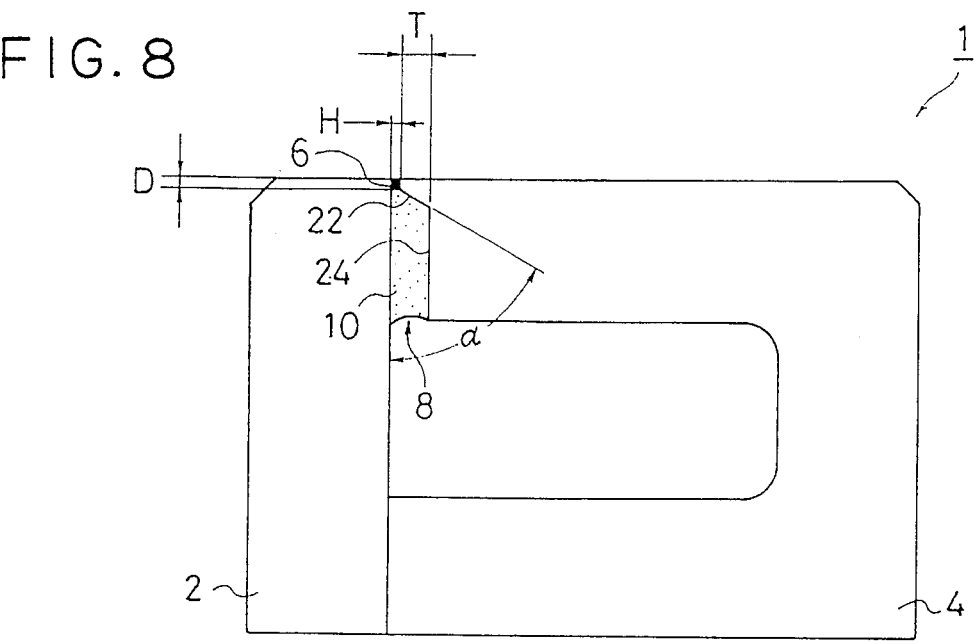
FIG. 8 is a descriptive view showing further another embodiment of the magnetic head according to the invention.
Figure 9:
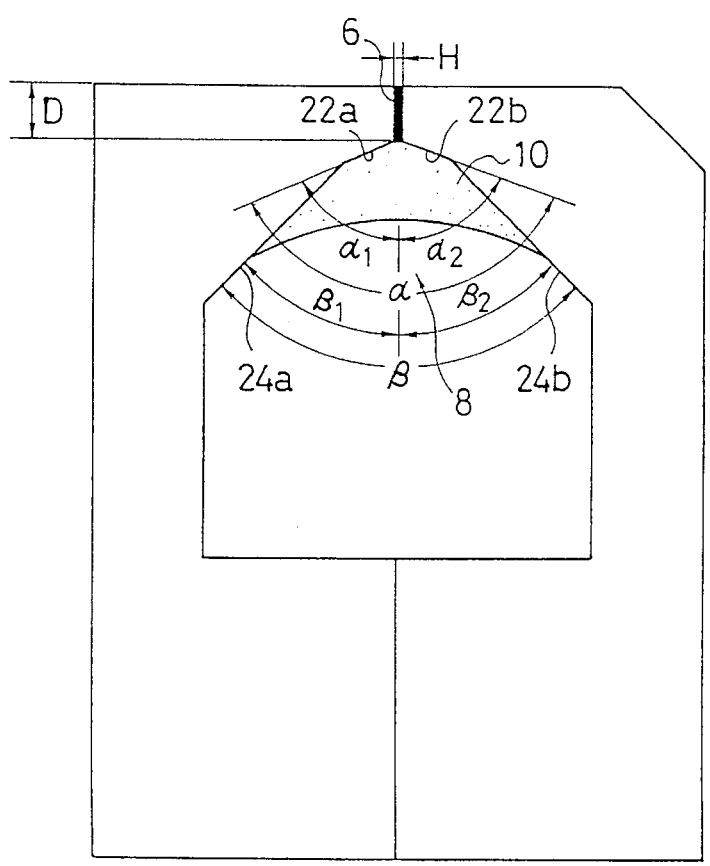
FIG. 9 is a descriptive view showing further another embodiment of the magnetic head according to the invention.

While in the above embodiments, the present invention has been described as applied to the magnetic head 1 of a doubly chamfered profile in which the apex portion 8 is formed by the first chamfered portion 22 and the second chamfered portion 24, as shown in FIG. 1, the present invention is not limited to this, but is applicable also to a magnetic head in which the apex angle (α) is set substantially to 90°, and the chamfered portions 22 and 24 are formed at an apex length (T), as shown in FIG. 7, a magnetic head in which the apex angle (α) is set to an angle other than 90°, for example 84°, and the chamfered portions 22 is formed at an apex length (T) in the C core, as shown in FIG. 8, a magnetic head in which a pair of magnetic cores are two C cores bonded together and at least one C core has an apex angle ($α_1$ or $α_2$) of at least 65° with β<α, as shown in FIG. 9, and other magnetic head in which large apex angle is formed, with similar effects in all these cases.

While, in the above embodiments, the magnetic film of the magnetic head 1 according to the invention has been described in connection with the Fe-Si-Al alloy magnetic materials, it is also possible to use an amorphous magnetic material, an iron nitride magnetic material or the like.

With the magnetic head according to the invention, as described above, the surface roughness ($R_{p-p}$) of the chamfered portion of the magnetic cores forming an apex portion is kept to 0.6 μm or under, thereby permitting elimination of scattering of the magnetic property, and implementation of a magnetic head using a soft magnetic thin film such as an Fe-Si-Al alloy magnetic thin film, suitably applicable for video heads, computer heads and other high-frequency and high-density recording heads required to have a high signal-to-noise ratio, which is excellent in both recording demagnetization and play-back efficiency. According to the manufacturing method of the invention, furthermore, it is possible to conduct processing so as to achieve a surface roughness ($R_{p-p}$) of 0.6 μm or under of the chamfered portion of the magnetic core by means of a #2500 or #1500 grinding stone, thereby permitting manufacture of a magnetic head at a high efficiency.

What is claimed is:

1. A magnetic head comprising a pair of magnetic core halves with mating surfaces thereof bonded together to form a gap, an apex portion being formed adjacent said gap, the apex portion having a chamfered portion formed in at least one of said magnetic core halves, said chamfered portion having a chamfered surface roughness ($R_{p-p}$) greater than 0.0 μm and up to 0.6 μm, the surface roughness ($R_{p-p}$) greater than 0.0 μm and up to 0.6 μm reducing scattering of magnetic properties.

2. The magnetic head according to claim 1, wherein said chamfered portion has a chamfered surface roughness ($R_{p-p}$) greater than 0.0 μm and up to 0.2 μm.

3. A magnetic head comprising a pair of magnetic core halves with mating surfaces thereof bonded together to form a gap, an apex portion being formed adjacent to said gap, said apex portion having a first chamfered portion and a second chamfered portion formed in at least one of said magnetic core halves, said first chamfered portion being formed such as to have a first apex angle (α) of 65° to 90° with respect to a vertical line parallel to the mating surfaces of the core halves over a prescribed apex length (T) conducting the apex position corresponding to a gap depth (D), the second chamfered portion being contiguous to the first chamfered portion and having a second apex angle (β) with respect to a vertical line parallel to the mating surfaces of the core halves smaller than the first apex angle (α), and at least said first chamfered portion having a chamfered surface roughness ($R_{p-p}$) of greater than 0.0 μm and up to 0.6 μm, the surface roughness ($R_{p-p}$) greater than 0.0 μm and up to 0.6 μm reducing scattering of magnetic properties.

4. The magnetic head according to claim 3, wherein said first chamfered portion has a chamfered surface roughness ($R_{p-p}$) greater than 0.0 μm and up to 0.2 μm.

* * * * *